US012590798B2

(12) United States Patent
Yosub et al.

(10) Patent No.: US 12,590,798 B2
(45) Date of Patent: Mar. 31, 2026

(54) MULTI-SENSOR DEPTH MAPPING

(71) Applicant: Apple Inc., Cupertino, CA (US)

(72) Inventors: Shay Yosub, Kfar Yehezkel (IL); Assaf Avraham, Givatayim (IL); Jawad Nawasra, San Francisco, CA (US); Jonathan Pokrass, Herzliya (IL); Moshe Laifenfeld, Haifa (IL); Nir Ben Zadok, Holon (IL); Niv Gilboa, Raanana (IL); Tal Kaitz, Kiryat Ono (IL); Ronen Akerman, Sunnyvale, CA (US); Naveh Levanon, Netanya (IL)

(73) Assignee: Apple Inc., Cupertino, CA (US)

( * ) Notice: Subject to any disclaimer, the term of this patent is extended or adjusted under 35 U.S.C. 154(b) by 1059 days.

(21) Appl. No.: 17/688,933

(22) Filed: Mar. 8, 2022

(65) Prior Publication Data

US 2022/0364849 A1     Nov. 17, 2022

Related U.S. Application Data

(60) Provisional application No. 63/186,828, filed on May 11, 2021.

(51) Int. Cl.
G01B 11/22          (2006.01)
G01S 7/4865          (2020.01)
(Continued)

(52) U.S. Cl.
CPC ............ G01B 11/22 (2013.01); G01S 7/4865 (2013.01); G01S 17/894 (2020.01); G06T 7/521 (2017.01);
(Continued)

(58) Field of Classification Search
None
See application file for complete search history.

(56) References Cited

U.S. PATENT DOCUMENTS

| | | | |
|---|---|---|---|
| 4,802,759 A | 2/1989 | Matsumoto et al. | |
| 6,377,700 B1 | 4/2002 | Mack et al. | |

(Continued)

FOREIGN PATENT DOCUMENTS

| | | |
|---|---|---|
| TW | 200929064 A | 7/2009 |
| WO | 9303579 A1 | 2/1993 |

(Continued)

OTHER PUBLICATIONS

Zhu et al., "Fusion of Time-of-Flight Depth and Stereo for High Accuracy Depth Maps", Proceedings of the IEEE Conference on Computer Vision and Pattern Recognition, pp. 1-8, Jun. 2008.
(Continued)

*Primary Examiner* — Luke D Ratcliffe
(74) *Attorney, Agent, or Firm* — Meitar Patents Ltd.; Daniel Kligler

(57)          ABSTRACT

Depth mapping apparatus includes an illumination assembly, which directs modulated optical radiation toward a target scene, and a camera, which captures a two-dimensional image of the target scene. A range sensor senses respective times of flight of photons reflected from a matrix of locations disposed across the target scene. A processor derives first depth coordinates of the matrix of locations responsively to the respective times of flight, derives second depth coordinates of the matrix of locations responsively to a transverse disparity between features in the two-dimensional image and corresponding reference features in a reference image, computes a disparity correction function based on a difference between the first and the second depth coordinates at the matrix of locations, corrects the transverse disparity between the two-dimensional image and the reference image using the disparity correction function, and generates a depth map of the target scene based on the corrected transverse disparity.

18 Claims, 3 Drawing Sheets

(51) Int. Cl.

| | |
|---|---|
| *G01S 17/894* | (2020.01) |
| *G06T 7/521* | (2017.01) |
| *G06T 7/55* | (2017.01) |
| *G06T 7/80* | (2017.01) |

(52) U.S. Cl.
CPC .................. *G06T 7/55* (2017.01); *G06T 7/80* (2017.01); *G06T 2207/10028* (2013.01)

(56) References Cited

U.S. PATENT DOCUMENTS

| | | | |
|---|---|---|---|
| 6,751,344 | B1 | 6/2004 | Grumbine |
| 8,126,261 | B2 | 2/2012 | Medioni et al. |
| 8,166,421 | B2 | 4/2012 | Magal et al. |
| 8,326,025 | B2 | 12/2012 | Boughorbel |
| 8,456,517 | B2 | 6/2013 | Spektor et al. |
| 9,582,889 | B2 | 2/2017 | Shpunt et al. |
| 10,152,801 | B2 | 12/2018 | Shpunt et al. |
| 10,636,155 | B2 | 4/2020 | Shpunt et al. |
| 10,690,488 | B2 | 6/2020 | Pesach et al. |
| 11,100,661 | B2 | 8/2021 | Shpunt et al. |
| 2002/0041327 | A1 | 4/2002 | Hildreth et al. |
| 2004/0105580 | A1 | 6/2004 | Hager et al. |
| 2005/0018209 | A1 | 1/2005 | Lemelin et al. |
| 2005/0111705 | A1 | 5/2005 | Waupotitsch et al. |
| 2006/0210146 | A1 | 9/2006 | Gu |
| 2006/0221250 | A1 | 10/2006 | Rossbach et al. |
| 2007/0133840 | A1 | 6/2007 | Cilia |
| 2008/0118143 | A1 | 5/2008 | Gordon et al. |
| 2009/0059201 | A1* | 3/2009 | Willner ................... G01S 17/58 356/5.01 |
| 2009/0060307 | A1 | 3/2009 | Ghanem et al. |
| 2009/0201384 | A1 | 8/2009 | Kang et al. |
| 2009/0226079 | A1 | 9/2009 | Katz et al. |
| 2009/0244309 | A1 | 10/2009 | Maison et al. |
| 2010/0278384 | A1 | 11/2010 | Shotton et al. |
| 2010/0303289 | A1 | 12/2010 | Polzin et al. |
| 2010/0328475 | A1 | 12/2010 | Thomas et al. |
| 2011/0001799 | A1 | 1/2011 | Rothenberger et al. |
| 2011/0285910 | A1 | 11/2011 | Bamji et al. |
| 2012/0051588 | A1 | 3/2012 | McEldowney |
| 2013/0141546 | A1* | 6/2013 | Asatani ..................... G06T 7/73 348/48 |
| 2014/0028804 | A1* | 1/2014 | Usuda .................. H04N 13/271 348/47 |
| 2015/0015895 | A1* | 1/2015 | Bridges ................ G01B 11/005 356/614 |
| 2019/0339369 | A1* | 11/2019 | Fenton .................... G06T 7/001 |

FOREIGN PATENT DOCUMENTS

| | | | |
|---|---|---|---|
| WO | 2007043036 | A1 | 4/2007 |
| WO | 2007105205 | A2 | 9/2007 |
| WO | 2008120217 | A2 | 10/2008 |

OTHER PUBLICATIONS

Mordohai et al., "Tensor Voting: A Perceptual Organization Approach to Computer Vision and Machine Learning," Synthesis Lectures on Image, Video and Multimedia Processing, lecture No. 8, pp. 1-136, year 2006.

Bhat et al., "Ordinal Measures for Image Correspondence", IEEE Transactions on Pattern Analysis and Machine Intelligence, vol. 20, No. 4, pp. 415-423, Apr. 1998.

Newey et al., "A Simple, Positive Semi-Definite, Heteroskedasticity and Autocorrelation Consistant Covariance Matrix", Technical Working Paper No. 55, National Bureau of Economic Research, Cambridge, MA, USA, pp. 1-14, Apr. 1986.

Boykov et al., "Fast Approximate Energy Minimization via Graph Cuts", IEEE Transactions on Pattern Analysis and Machine Intelligence, vol. 23, No. 11, pp. 1222-1239, year 2001.

Weiss et al., "On the Optimality of Solutions of the Max-Product Belief Propagation Algorithm in Arbitrary Graphs", IEEE Transactions on Information Theory, vol. 47, issue 2, pp. 1-11, year 2001.

Sun et al., "Stereo Matching Using Belief Propagation," IEEE Transactions on Pattern Analysis and Machine Intelligence, vol. 25, No. 7, pp. 787-800, Jul. 2003.

Felzenszwalb et al., "Efficient Belief Propagation for Early Vision", International Journal of Computer Vision, vol. 70, No. 1, pp. 1-8, year 2006.

Koschan et al., "Dense Depth Maps by Active Color Illumination and Image Pyramids", Advances in Computer Vision, pp. 137-148, year 1997.

Scharstein et al, "High-Accuracy Stereo Depth Maps Using Structured Light", IEEE Proceedings of the Computer Society Conference on Computer Vision and Pattern Recognition, pp. 195-202, Jun. 2003.

\* cited by examiner

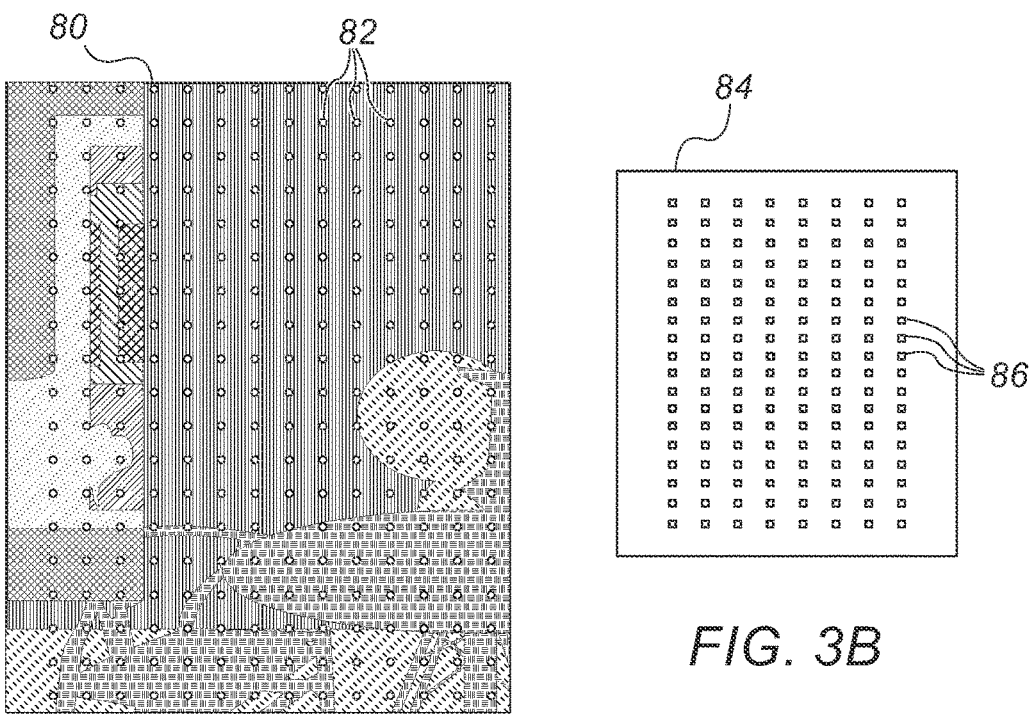
*FIG. 3A*
*FIG. 3B*
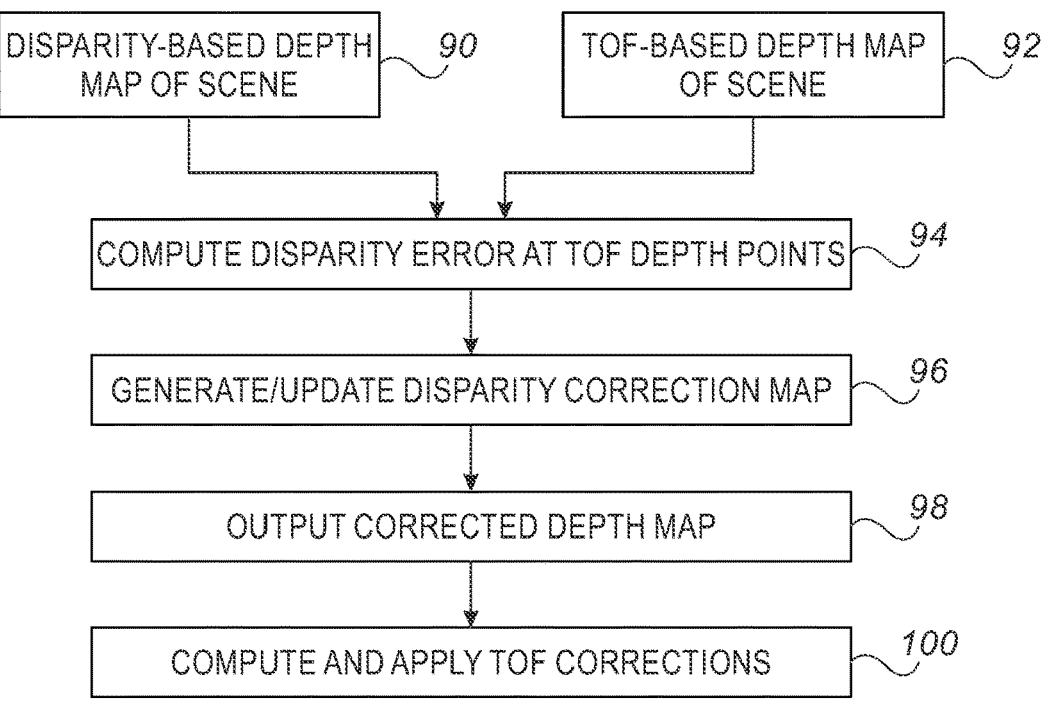
*FIG. 4*

MULTI-SENSOR DEPTH MAPPING

CROSS-REFERENCE TO RELATED APPLICATION

This application claims the benefit of U.S. Provisional Patent Application 63/186,828, filed May 11, 2021, which is incorporated herein by reference.

FIELD OF THE INVENTION

The present invention relates generally to systems and methods for depth mapping, and particularly to improving the accuracy of depth maps.

BACKGROUND

Existing and emerging consumer applications have created an increasing need for real-time three-dimensional (3D) imagers. These imaging devices, also known as depth sensors or depth mappers, enable the remote measurement of distance to each point in a target scene—referred to as target scene depth—typically by illuminating the target scene with an optical beam and analyzing the reflected optical signal. (In the description that follows and in the claims, the terms "light," "optical," and "illumination" are used interchangeably to refer to electromagnetic radiation in any of the visible, infrared, and ultraviolet spectral ranges.)

Some depth mapping systems compute depth coordinates by measuring transverse disparity between the features in a two-dimensional image captured of a target scene and corresponding features in a reference image. The term "transverse disparity" refers to the relative shift of the features in the image plane between the images. At each point in the image, the transverse disparity varies as a function of the depth, i.e., the axial distance, of the corresponding point in the scene. Thus, a depth map can be generated by measuring the transverse disparity at each point. Examples of such disparity-based depth mapping systems include depth mappers based on structured light and stereoscopic cameras. Systems of these sorts are described, for example, in U.S. Pat. Nos. 8,456,517 and 9,582,889, whose disclosures are incorporated herein by reference.

Other depth mappers measure depth by sensing the time of flight (ToF) of photons transmitted to and reflected back from points in a target scene. In direct ToF mapping, a sequence of pulses of optical radiation is transmitted toward the target scene, and a range sensor measures the round-trip times of flight of the pulses as they travel from the radiation source to the target scene and back to the sensor. In indirect ToF mapping, radiation modulated with a carrier waveform at a selected carrier frequency is transmitted toward the target scene, and the range sensor finds depth coordinates by measuring the phase of the carrier frequency in the reflected photons.

SUMMARY

Embodiments of the present invention that are described hereinbelow provide apparatus and methods for depth sensing with enhanced accuracy.

There is therefore provided, in accordance with an embodiment of the invention, depth mapping apparatus, including an illumination assembly, which is configured to direct modulated optical radiation toward a target scene, a camera, which is configured to capture a two-dimensional image of the target scene, and a range sensor, which is configured to sense respective times of flight of photons reflected from a matrix of locations disposed across the target scene. A processor is configured to derive first depth coordinates of the matrix of locations responsively to the respective times of flight, to derive second depth coordinates of the matrix of locations responsively to a transverse disparity between features in the two-dimensional image and corresponding reference features in a reference image, to compute a disparity correction function based on a difference between the first and the second depth coordinates at the matrix of locations, to correct the transverse disparity between the two-dimensional image and the reference image using the disparity correction function, and to generate a depth map of the target scene based on the corrected transverse disparity.

In one embodiment, the illumination assembly is configured to project a pattern of spatially modulated radiation onto the target scene, and the reference image includes a reference pattern, and the processor is configured to measure the transverse disparity between the projected pattern captured in the two-dimensional image and the reference pattern.

In another embodiment, the camera includes a stereoscopic pair of first and second image sensors, wherein the first image sensor captures the two-dimensional image, and the second image sensor captures the reference image.

In some embodiments, the illumination assembly is configured to direct temporally modulated optical radiation toward the target scene, and the range sensor is configured to sense the respective times of flight responsively to a temporal modulation of the reflected photons. In one embodiment, the temporally modulated radiation includes a sequence of pulses of the optical radiation, and the range sensor is configured to measure the times of flight of the pulses. In another embodiment, the temporally modulated radiation is modulated with a carrier waveform at a selected carrier frequency, and the range sensor is configured to measure a phase of the carrier frequency in the reflected photons.

In a disclosed embodiment, the range sensor includes an array of sensing elements and objective optics, which image each of the matrix of the locations onto a respective set of one or more of the sensing elements.

In some embodiments, the processor is configured to compute the disparity correction function by calculating respective local disparity corrections at the matrix of the locations and interpolating and extrapolating from the local disparity corrections to generate the disparity correction function over an entire field of view of the camera. In a disclosed embodiment, the processor is configured to combine the local disparity corrections computed over different areas of the field of view in different target scenes in order to generate and update the disparity correction function. Additionally or alternatively, the processor is configured to store the disparity correction function computed over a first target scene and to apply the disparity correction function in generating depth maps over further target scenes. Further additionally or alternatively, the processor is configured to compute, responsively to the difference between the first and the second depth coordinates at the matrix of locations, a global correction to one or more parameters of the camera and to apply the global correction in generating the disparity correction function.

In a disclosed embodiment, the processor is configured to compute a range correction function over a first span of distances from the apparatus by comparing the first depth coordinates to the second depth coordinates in the depth map, and to apply the range correction function in correcting the first depth coordinates over a second span of distances, greater than the first span.

There is also provided, in accordance with an embodiment of the invention, a method for depth mapping, which includes directing modulated optical radiation toward a target scene, capturing a two-dimensional image of the target scene, and sensing respective times of flight of photons reflected from a matrix of locations disposed across the target scene. First depth coordinates of the matrix of locations are derived responsively to the respective times of flight. Second depth coordinates of the matrix of locations are derived responsively to a transverse disparity between features in the two-dimensional image and corresponding reference features in a reference image. A disparity correction function is computed based on a difference between the first and the second depth coordinates at the matrix of locations. The transverse disparity between the two-dimensional image and the reference image is corrected using the disparity correction function. A depth map of the target scene is generated based on the corrected transverse disparity.

The present invention will be more fully understood from the following detailed description of the embodiments thereof, taken together with the drawings in which:

BRIEF DESCRIPTION OF THE DRAWINGS

FIG. 3A is a schematic representation of a pattern of spots projected onto a target scene, in accordance with an embodiment of the invention;

FIG. 3B is a schematic frontal view of a ToF sensing array, in accordance with an embodiment of the invention; and FIG. 4 is a flow chart that schematically illustrates a method for depth mapping, in accordance with an embodiment of the invention.

DETAILED DESCRIPTION OF EMBODIMENTS

Overview

Figure 1:
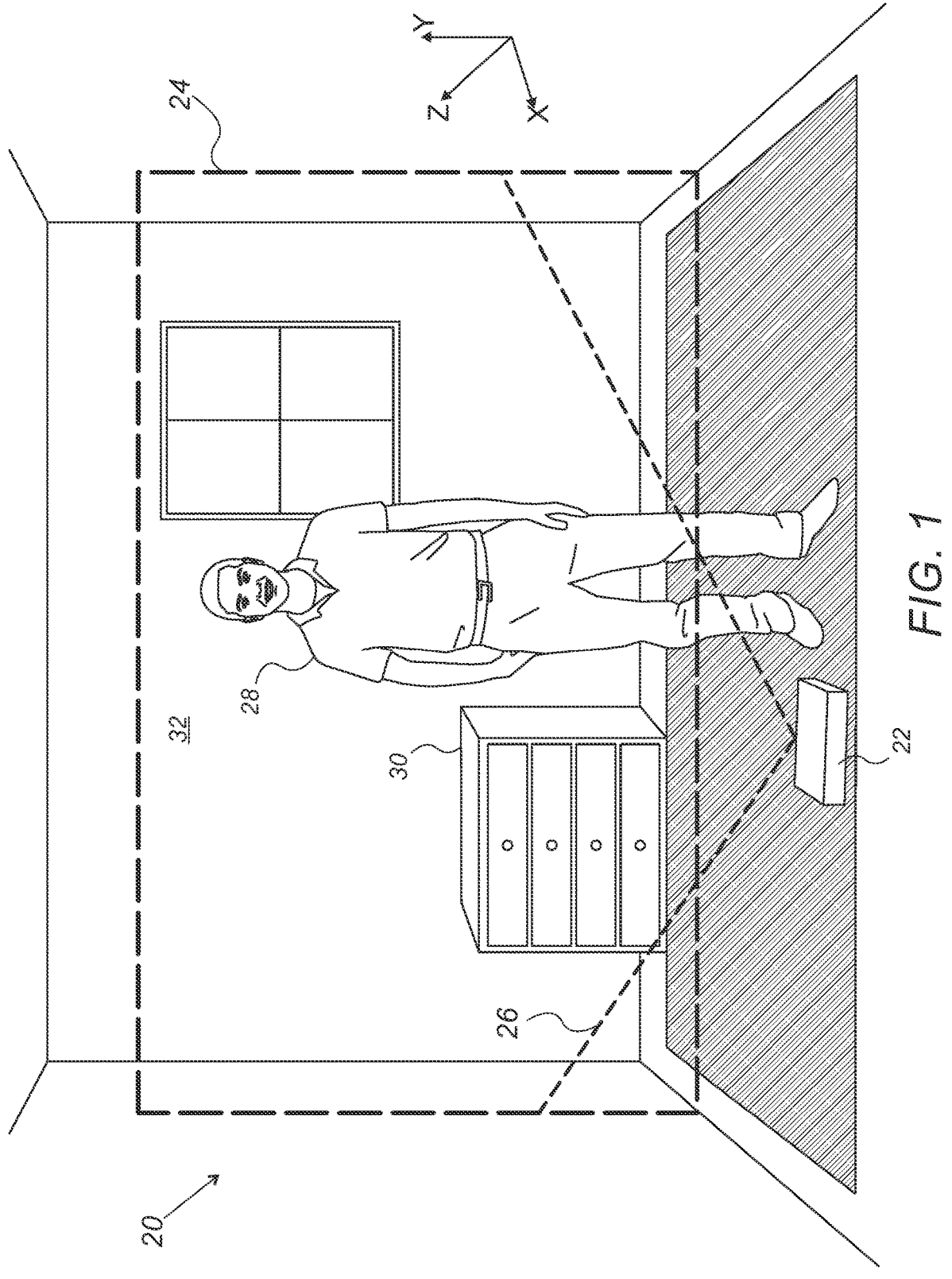
FIG. 1 is a schematic, pictorial illustration of a depth mapping system, in accordance with an embodiment of the invention.

Disparity-based depth mapping systems, such as stereoscopic cameras and structured light systems, rely on parallax between the optical axes of the source and reference images to create transverse disparity and thus to enable measurement of depth. Since the distance between the optical axes, referred to as the "baseline," is fixed, the effect of parallax decreases with increasing distance from the imaging device. Therefore, disparity-based depth mapping systems tend to be most accurate at short distances and lose accuracy with increasing distance.

The relation between transverse disparity and depth in a disparity-based depth mapping system depends on the length of the baseline and on the focal parameters of the imaging device. Typically, the imaging device is calibrated in the factory under well-controlled conditions. If the baseline or focus changes subsequently, due to mechanical shock or thermal effects, for example, the depth measurements will lose accuracy.

ToF-based depth mapping systems, on the other hand, are more accurate at longer ranges and are less vulnerable to mechanical and thermal effects than disparity-based depth measurements. Short-range ToF measurements, however, can be strongly affected by small deviations between the time of photon transmission and the time-sensitive signals that are generated in response to photon arrival. Furthermore, whereas disparity-based depth mapping systems can use standard image sensors with small pitch and high transverse resolution, ToF systems typically require special-purpose radiation sources and range sensors, with inherently lower resolution.

Embodiments of the present invention provide depth mapping systems that combine the high transverse resolution of disparity-based depth sensors with the high depth accuracy of ToF-based range sensors. These systems use the accurate depth measurements made by a ToF sensor in generating a disparity correction function, which is then applied in improving the accuracy of disparity-based depth measurements made by a patterned light or stereoscopic depth sensor. This disparity correction is particularly significant at longer measurement distances, as well as in compensating for loss of calibration due to factors such as mechanical shocks and environmental conditions. In some embodiments, the disparity-corrected depth measurements made by the disparity-based depth sensor are also used in computing a range correction function that can be used to improve the accuracy of the longer-range depth measurements provided by the ToF sensor.

In the disclosed embodiments, an illumination assembly directs modulated optical radiation toward a target scene. For purposes of ToF sensing, the radiation is temporally modulated, for example in the form of short pulses for direct ToF sensing or carrier wave modulation for indirect ToF sensing. In addition, the radiation may be spatially modulated to project a pattern of structured light for disparity-based sensing. Based on the temporal modulation, a range sensor senses respective times of flight of photons reflected from a matrix of locations disposed across the target scene. For disparity-based sensing, a camera captures a two-dimensional image of the target scene.

A processor computes ToF-based depth coordinates of the matrix of locations based on the respective times of flight measured by the range sensor. The processor also derives disparity-based depth coordinates of the matrix of locations by measuring the transverse disparity between features in the two-dimensional image and corresponding reference features in a reference image. (The reference image may, for example, contain a fixed reference pattern of the structured light at a certain calibration distance, or it may be a second image captured by a second camera in a stereoscopic pair.) Based on the difference between the ToF-based and the disparity-based depth coordinates at the matrix of locations, the processor computes a disparity correction function, and then applies this function in correcting its measurements of the transverse disparity between the two-dimensional image and the reference image. The processor typically interpolates between and extrapolates outside the locations in the matrix of the ToF-based depth coordinates in order to generate a spatially continuous disparity correction function over the entire area of the two-dimensional image. The processor is thus able to generate an accurate, high-resolution depth map of the target scene based on the corrected transverse disparity.

The processor stores the disparity correction function for subsequent application in generating depth maps over other target scenes. The processor can also check and update the disparity correction function opportunistically from time to time, based on depth measurements made by the system in the field, in order to compensate for changes in calibration, as noted above. The disparity correction function may be updated locally in certain locations or areas of the matrix at different times, depending on mapping conditions. Thus, the present embodiments provide a depth mapping solution that is robust and accurate over a large range of distances and a wide field of view, for use in a wide variety of depth mapping applications.

System Description

FIG. 1 is a schematic, pictorial illustration of a depth mapping system 20, in accordance with an embodiment of the invention. In the pictured scenario, a depth mapping device 22 generates a depth map of a target scene 24 within a field of view 26 of the device. In this example, target scene 24 contains objects such as a human FIG. 28, furniture 30, and a wall 32 in the background. The front (transverse) plane of device 22 is taken, for the sake of convenience, to be the X-Y plane, and depth coordinates of points in the target scene are measured along the Z-axis. Depth maps generated by imaging device 22 thus represent target scene 24 as a grid of points in the X-Y plane with a depth coordinate indicating the distance measured to each point.

Imaging device 22 measures two sets of depth coordinates over target scene 24, as described below in greater detail. Device 22 measures first, ToF-based depth coordinates by directing temporally modulated optical radiation toward points in target scene 24 and measuring the times of flight of photons reflected from each point. Device 22 measures second, disparity-based depth coordinates by capturing two-dimensional images of the target scene and measuring the transverse disparity between features in the two-dimensional image and corresponding reference features in a reference image.

Figure 2:
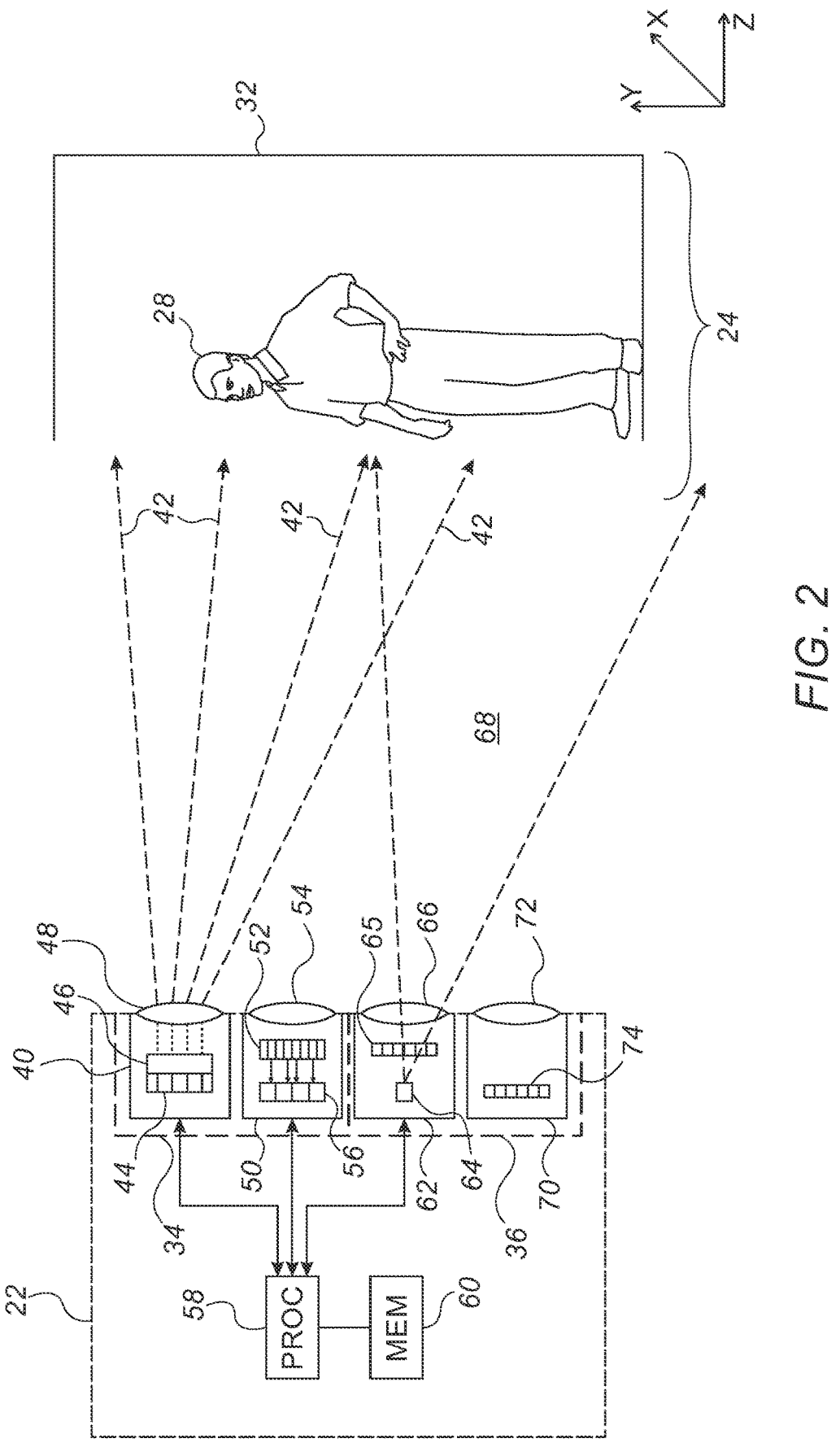
FIG. 2 is a schematic side view of the depth mapping system of FIG. 1, in accordance with an embodiment of the invention.

FIG. 2 is a schematic side view of system 20, showing details of depth mapping device 22, in accordance with an embodiment of the invention. These details are shown by way of example, for the sake of concreteness and clarity, to aid in understanding the operating principles of the present invention in generating and correcting depth maps. Alternatively, these principles may be applied in other sorts of systems with suitable depth mapping and imaging capabilities.

Depth mapping device 22 comprises a ToF-based sensing assembly 34 and a disparity-based sensing assembly 36. ToF-based sensing assembly 34 comprises an illumination subassembly 40, which emits temporally modulated optical radiation in the form of multiple pulsed beams 42 directed toward target scene 24. In the present example, illumination subassembly 40 comprises a two-dimensional array 44 of vertical-cavity surface-emitting lasers (VCSELs), which are driven to emit sequences of short pulses of optical radiation. Optionally, a diffractive optical element (DOE) 46 can be used to replicate the actual beams emitted by the VCSELs in array 44 so as to output a larger number of beams 42 (for example, on the order of 500 beams) at different, respective angles from subassembly 40. A collimating lens 48 (which may be positioned either between array 44 and DOE 46 or following DOE 46 as shown in FIG. 2) projects beams 42 toward a corresponding matrix of locations in target scene 24.

A range sensor 50 in sensing assembly 34 comprises a two-dimensional array 52 of sensing elements, such as single-photon avalanche photodiodes (SPADs), which output signals indicative of respective times of incidence of photons on the sensing elements. Objective optics 54 form an image of target scene 24 on array 52. Processing units are coupled to groups of mutually adjacent sensing elements, which are referred to as "super-pixels," and process together the signals from the sensing elements in each of the super-pixels in order to generate a measure of the times of arrival of photons on the sensing elements in the group following each pulse of beams 42. Processing units 56 thus output values that are indicative of the distance to respective points in scene 24, and may also output an indication of the signal strength. For clarity of explanation, processing units 56 are shown in FIG. 2 as separate from array 52, but in some implementations the processing units and array are integrated in a single integrated circuit device.

A processor 58 drives array 44 to emit pulses, receives time-of-arrival data from processing units 56, and provides control signals to the processing units. Based on the times of arrival, processor 58 calculates the times of flight of the photons in each of beams 42, and thus finds depth coordinates of the corresponding matrix of locations in target scene 24. This mapping is based on the timing of the emission of beams 42 by radiation source 40 and the times of arrival (i.e., times of incidence of reflected photons) measured by the processing units 56, relative to the emission times. Processor 58 stores the depth coordinates in a memory 60.

Disparity-based sensing assembly 36 comprises an illumination subassembly 62 and a two-dimensional imaging camera 70. (Illumination subassemblies 40 and 62 are collectively referred to as the illumination assembly in depth mapping device 22.) It is assumed in this example that the optical axes of illumination subassembly 62 and camera 70 are spaced apart along the Y-axis by a certain baseline distance B.

Illumination subassembly 62 comprises a radiation source 64, such as an array of VCSELs arranged in a certain pattern on a substrate, for example as described in U.S. Pat. No. 10,690,488, whose disclosure is incorporated herein by reference. Radiation source 64 generates a pattern of radiation in the near infrared (NIR) range, such as a pattern of spots corresponding to the pattern of the VCSELs in the array. Optionally, a DOE 65 generates multiple replicas of the pattern, and a projection lens projects a corresponding spatially modulated structured light pattern 68 onto target scene 24.

Camera 70 comprises an image sensor 74, such as a CMOS image sensor operating in the NIR range, as is known in the art. An imaging lens 72 forms an image of target scene 24 on image sensor 74, which thus outputs an electronic image of the target scene, and specifically of light pattern 68 as it appears on the scene. The features of the projected pattern 68, i.e., the locations of the spots in the present example, will be shifted transversely on image sensor 74 due to parallax by an amount that is proportional to the depth (Z-coordinate) of the corresponding points in target scene 24 onto which the spots are projected. The proportionality depends on the baseline distance between the respective optical axes of illumination subassembly 62 and camera 70 and on the effective focal length (EFL) of camera 70, as determined by the optical power of lens 72 and its distance from image sensor 74.

Processor 58 compares the pattern in the image captured by camera 70 to a reference image of the pattern that is stored in memory 60 in order to measure the transverse disparity of each of the spots in the captured image relative to the reference image. For example, the reference image may correspond to an image of the pattern projected onto a plane at a known distance Zo from device 22. The disparity $dy_{ij}$ at any given pixel (i,j) in the captured image then indicates the Z-coordinate (i.e., the depth) of the corresponding location in the target scene relative to this plane. For example, the depth $Z_{ij}$ for a given pixel in the disparity-based depth map can be expressed by the following formula:

$$\frac{Z_{ij} - Z_0}{Z_{ij}Z_0} = \frac{dy_{ij} \cdot P}{B \cdot EFL}$$

wherein the disparity is measured in pixels, and P is the pixel pitch of image sensor 74. Processor 58 thus computes disparity-based depth coordinates over the entire scene, including the matrix of locations at which ToF-based depth coordinates were computed. It can be seen from the above formula, however, that the depth measurements will be sensitive to any changes that may occur in the parameters of disparity-based sensing assembly 36, and particularly of camera 70, such as the values of B and EFL, as well as shift and rotation of the camera relative to the reference image.

Because ToF-based sensing assembly 34 and disparity-based sensing assembly 36 are mounted in a fixed spatial and optical relation relative to one another, the electronic image output by camera 70 will be registered with the image that is formed by objective optics 54 on array 52 (subject to adjustment of the registration for parallax between the assemblies if necessary). Processor 58 is thus able to register the ToF-based and disparity-based depth maps, and to compare the depth maps in order to correct for changes in the parameters of disparity-based sensing assembly 36 and compute a disparity correction function, as described further hereinbelow.

Processor 58 typically comprises a programmable processor, which is programmed in software and/or firmware to carry out the functions that are described herein. Alternatively or additionally, processor 58 may comprise hardwired and/or programmable hardware logic circuits, which carry out at least some of the functions of the processor. Although processor 58 is shown in FIG. 2, for the sake of simplicity, as a single, monolithic functional block, in practice the processor may comprise a single chip or a set of two or more chips, with suitable interfaces for receiving and outputting the signals that are illustrated in the figure and are described in the text.

Furthermore, although FIG. 2 and the description above relate, for the sake of concreteness and clarity, to specific types and configurations of depth mappers, the principles of the present invention may similarly be applied, mutatis mutandis, to ToF-based and disparity-based depth sensors of other types and configurations. For example, to perform indirect ToF-based depth mapping, illumination subassembly 40 may output radiation that is modulated with a carrier waveform at a selected carrier frequency, and range sensor 50 may then measure the phase of the carrier frequency in the radiation reflected from each of a matrix of points in target scene 24. Additionally or alternatively, illumination subassembly 62 may project a pattern of stripes or other sorts of structured light patterns onto target scene 24. As another alternative, illumination subassembly 62 may be replaced by another camera, forming a stereoscopic pair with camera 70; and in this case, processor 58 will generate a depth map of scene based on the disparity between a reference image captured by this other camera and the image output by camera 70. All such alternative arrangements are considered to be within the scope of the present invention.

Methods of Operation

FIG. 3A is a schematic representation of a matrix of spots 82 of optical radiation that are projected onto a target scene 80, in accordance with an embodiment of the invention. Each spot 82 is cast by a corresponding beam 42 that is output from illumination subassembly 40 (FIG. 2). The density of the spot pattern determines the transverse resolution (in the X-Y plane) of the ToF-based depth coordinates that can be generated by device 22. By contrast, camera 70 captures a high-resolution image of target scene 80, which can thus be used to generate depth coordinates with higher transverse resolution.

FIG. 3B is a schematic frontal view of array 52 onto which target scene 80 is imaged, in accordance with an embodiment of the invention. The sensing elements, such as SPADs, in array 52 are too small to be seen in this figure. Rather, FIG. 3B shows the locations of spots 86 that are reflected from target scene 80 and imaged onto array 52 by objective optics 54. In other words, each spot 86 is the image on array 52 of a corresponding spot 82 that is projected onto scene 80 by illumination subassembly 40. The matrix of spots 86 is superimposed in FIG. 3B on an area 84 of the image captured by camera 70.

FIG. 4 is a flow chart that schematically illustrates a method for depth mapping, in accordance with an embodiment of the invention. The method is described, for the sake of clarity and concreteness, with reference to the elements of system 20 (FIGS. 1 and 2), but the principles of this method may similarly be applied, mutatis mutandis, in other systems that measure both ToF-based and disparity-based depth coordinates.

The method begins with capture and calculation of a disparity-based depth map, at a disparity mapping step 90, and a ToF-based depth map, at a ToF mapping step 92. The ToF-based depth coordinates $Z_{T,ij}$, are computed at the matrix of spots 86, whereas the disparity-based depth coordinates $Z_{D,ij}$ are computed with higher transverse (X,Y) resolution over the area 84 (FIG. 3B). Processor 58 compares the respective depth values at each of the matrix of spots 86, at an error computation step 94, in order to compute a local disparity correction $\Delta y_{ij}$:

$$\Delta y_{ij} = \frac{B \cdot EFL}{P}\left(\frac{1}{Z_{D,ij}} - \frac{1}{Z_{T,ij}}\right)$$

Optionally, in preparation for computing the local disparity corrections at step 94, processor 58 computes global corrections to the parameters of disparity-based sensing assembly 36, as noted above. For example, processor 58 may apply an optimization process to calibrate the values of one or more of B, EFL, rotation, and shift that will reduce the overall difference between $Z_{T,ij}$ and $Z_{D,ij}$, for example by minimizing the mean square value of $(Z_{T,ij}-Z_{D,ij})$ or another suitable metric. The local disparity correction values $\Delta y_{ij}$ can then be computed subject to the global corrections.

Processor 58 applies this matrix of disparity correction values in generating a disparity correction map over all of area 84, at a correction map generation step 96. For this purpose, processor 58 interpolates the disparity correction values between spots 86 and extrapolates the disparity correction values to cover parts of area 84 that are outside the matrix of spots 86. The disparity correction map is stored in memory 60. If a disparity correction map was computed and stored previously, processor 58 may compare the current correction values to the stored values in order to update the map as needed. This sort of update need not be carried out over all of area 84 at once, but rather may be computed over different parts of area 84 at different times. For example, processor 58 may select parts of area 84 for which depth values in a given target scene were found with high confidence, and may use only the disparity correction values from these areas in updating the disparity correction map.

For each pixel in the image acquired by camera 70, processor 58 applies the local disparity correction to find the corrected disparity value: $y_{ij\text{-}corrected} = y_{ij} - \Delta y_{ij}$, and then uses these corrected disparity values in generating a corrected depth map, at a map correction step 98. As noted earlier, the disparity correction map is stored in memory 60 for use in correcting subsequent depth maps.

When device 22 is to be used in mapping depth over a large range, the depth map may combine disparity-based values in the nearer part of the range with ToF-based values in the more distant part of the range. In the middle span of distances, both ToF-based sensing assembly 34 and disparity-based sensing assembly 36 typically give reliable results (particularly after correction of the disparity-based depth map at step 98). In one embodiment, to improve the accuracy of the ToF-based depth measurements in the farther span of distances, processor 58 computes a range correction function over the middle span of distances by comparing the measured ToF-based depth coordinates to the corrected disparity-based depth coordinates in the depth map, at a ToF correction step 100. Based on the difference between these depth coordinates, processor 58 computes and stores a range correction function for the ToF values over the matrix of locations corresponding to spots 86 (FIG. 3B). The processor can then apply this range correction function in correcting the ToF-based depth coordinates over both the middle span and the farther span of distances.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which will occur to persons skilled in the art upon reading the foregoing description and which are not disclosed in the prior art.

The invention claimed is:

1. Depth mapping apparatus, comprising:
an illumination assembly, which is configured to direct modulated optical radiation toward a target scene;
a camera, which is configured to capture a two-dimensional image of the target scene;
a range sensor, which is configured to sense respective times of flight of photons reflected from a matrix of locations disposed across the target scene; and
a processor, which is configured to derive first depth coordinates of the matrix of locations responsively to the respective times of flight, to derive second depth coordinates of the matrix of locations responsively to a transverse disparity between features in the two-dimensional image and corresponding reference features in a reference image, to compute a disparity correction function based on a difference between the first and the second depth coordinates at the matrix of locations, to correct the transverse disparity between the two-dimensional image and the reference image using the disparity correction function, and to generate a depth map of the target scene based on the corrected transverse disparity,
wherein the processor is configured to compute the disparity correction function by calculating respective local disparity corrections at the matrix of the locations and interpolating and extrapolating from the local disparity corrections to generate the disparity correction function over an entire field of view of the camera.

2. The apparatus according to claim 1, wherein the illumination assembly is configured to project a pattern of spatially modulated radiation onto the target scene, and the reference image comprises a reference pattern, and wherein the processor is configured to measure the transverse disparity between the projected pattern captured in the two-dimensional image and the reference pattern.

3. The apparatus according to claim 1, wherein the camera comprises a stereoscopic pair of first and second image sensors, wherein the first image sensor captures the two-dimensional image, and the second image sensor captures the reference image.

4. The apparatus according to claim 1, wherein the illumination assembly is configured to direct temporally modulated optical radiation toward the target scene, and the range sensor is configured to sense the respective times of flight responsively to a temporal modulation of the reflected photons.

5. The apparatus according to claim 4, wherein the temporally modulated radiation comprises a sequence of pulses of the optical radiation, and the range sensor is configured to measure the times of flight of the pulses.

6. The apparatus according to claim 4, wherein the temporally modulated radiation is modulated with a carrier waveform at a selected carrier frequency, and the range sensor is configured to measure a phase of the carrier frequency in the reflected photons.

7. The apparatus according to claim 1, wherein the range sensor comprises an array of sensing elements and objective optics, which image each of the matrix of the locations onto a respective set of one or more of the sensing elements.

8. The apparatus according to claim 1, wherein the processor is configured to combine the local disparity corrections computed over different areas of the field of view in different target scenes in order to generate and update the disparity correction function.

9. The apparatus according to claim 1, wherein the processor is configured to store the disparity correction function computed over a first target scene and to apply the disparity correction function in generating depth maps over further target scenes.

10. The apparatus according to claim 1, wherein the processor is configured to compute, responsively to the difference between the first and the second depth coordinates at the matrix of locations, a global correction to one or more parameters of the camera and to apply the global correction in generating the disparity correction function.

11. Depth mapping apparatus, comprising:
an illumination assembly, which is configured to direct modulated optical radiation toward a target scene;
a camera, which is configured to capture a two-dimensional image of the target scene;
a range sensor, which is configured to sense respective times of flight of photons reflected from a matrix of locations disposed across the target scene; and
a processor, which is configured to derive first depth coordinates of the matrix of locations responsively to the respective times of flight, to derive second depth coordinates of the matrix of locations responsively to a transverse disparity between features in the two-dimensional image and corresponding reference features in a reference image, to compute a disparity correction function based on a difference between the first and the second depth coordinates at the matrix of locations, to correct the transverse disparity between the two-dimensional image and the reference image using the disparity correction function, and to generate a depth map of the target scene based on the corrected transverse disparity, wherein the processor is configured to compute a range correction function over a first span of distances from the apparatus by comparing the first depth coordinates to the second depth coordinates in the depth map, and to apply the range correction function in correcting the first depth coordinates over a second span of distances, greater than the first span.

12. A method for depth mapping, comprising:

directing modulated optical radiation toward a target scene;

capturing a two-dimensional image of the target scene;

sensing respective times of flight of photons reflected from a matrix of locations disposed across the target scene;

deriving first depth coordinates of the matrix of locations responsively to the respective times of flight;

deriving second depth coordinates of the matrix of locations responsively to a transverse disparity between features in the two-dimensional image and corresponding reference features in a reference image;

computing a disparity correction function based on a difference between the first and the second depth coordinates at the matrix of locations, wherein computing the disparity correction function comprises calculating respective local disparity corrections at the matrix of the locations and interpolating and extrapolating from the local disparity corrections to generate the disparity correction function over an entire field of view of the two-dimensional image;

correcting the transverse disparity between the two-dimensional image and the reference image using the disparity correction function; and generating a depth map of the target scene based on the corrected transverse disparity.

13. The method according to claim 12, wherein directing the modulated optical radiation comprises projecting a pattern of spatially modulated radiation onto the target scene, wherein the reference image comprises a reference pattern, and wherein deriving the second depth coordinates comprises measuring the transverse disparity between the projected pattern captured in the two-dimensional image and the reference pattern.

14. The method according to claim 12, wherein directing the modulated optical radiation comprises directing temporally modulated optical radiation toward the target scene, and wherein sensing the respective times of flight comprises measuring the respective times of flight responsively to a temporal modulation of the reflected photons.

15. The method according to claim 14, wherein the temporally modulated radiation comprises a sequence of pulses of the optical radiation, and wherein measuring the respective times of flight comprises sensing the times of flight of the pulses.

16. The method according to claim 14, wherein the temporally modulated radiation is modulated with a carrier waveform at a selected carrier frequency, and wherein measuring the respective times of flight comprises sensing a phase of the carrier frequency in the reflected photons.

17. The method according to claim 12, wherein computing the disparity correction function comprises storing the disparity correction function computed over a first target scene, and wherein correcting the transverse disparity comprises applying the stored disparity correction function in generating depth maps over further target scenes.

18. The method according to claim 12, and wherein generating the depth map comprises computing a range correction function over a first span of distances by comparing the first depth coordinates to the second depth coordinates in the depth map, and applying range correction function in correcting the first depth coordinates over a second span of distances, greater than the first span.

* * * * *